United States Patent
Eggebraaten et al.

(10) Patent No.: US 9,600,173 B2
(45) Date of Patent: *Mar. 21, 2017

(54) CONSUMING DATA ON A TOUCHSCREEN DEVICE

(71) Applicant: International Business Machines Corporation, Armonk, NY (US)

(72) Inventors: Thomas J. Eggebraaten, Rochester, MN (US); Jesse R. Gorzinski, Rochester, MN (US); Shannon E. Wenzel, Colby, WI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 331 days.

This patent is subject to a terminal disclaimer.

(21) Appl. No.: 14/159,854

(22) Filed: Jan. 21, 2014

(65) Prior Publication Data

US 2015/0205477 A1 Jul. 23, 2015

(51) Int. Cl.
G06F 3/0488 (2013.01)
G06F 3/0484 (2013.01)
G06F 17/30 (2006.01)
G06F 17/24 (2006.01)

(52) U.S. Cl.
CPC ........ *G06F 3/0488* (2013.01); *G06F 3/04845* (2013.01); *G06F 3/04883* (2013.01); *G06F 3/04886* (2013.01); *G06F 17/245* (2013.01); *G06F 17/3056* (2013.01); *G06F 17/30557* (2013.01)

(58) Field of Classification Search
CPC .... G06F 3/048; G06F 3/0488; G06F 3/04883; G06F 17/30557
USPC .......................................................... 715/769
See application file for complete search history.

(56) References Cited

U.S. PATENT DOCUMENTS

| | | | |
|---|---|---|---|
| 2012/0013540 A1* | 1/2012 | Hogan | G06F 3/04883 345/173 |
| 2012/0173963 A1 | 7/2012 | Hoke et al. | |
| 2014/0012922 A1 | 1/2014 | Wu | |

(Continued)

OTHER PUBLICATIONS

U.S. Appl. No. 14/167,435, entitled Consuming Data on a Touchscreen Device, filed Jan. 29, 2014.

(Continued)

*Primary Examiner* — Angie Badawi
(74) *Attorney, Agent, or Firm* — Patterson + Sheridan, LLP

(57) ABSTRACT

System and computer program product to consume data on a mobile device. Data records are outputted according to a columnar or row orientation in a first panel of an application. Four other panels, each initially hidden from view, are defined to receive data from the user via a predefined touchscreen gesture. If an orientation of the gesture matches the orientation of the data records, the set of data records is either archived or deleted to a respective panel, of the four other panels, according to a direction of the gesture and a predefined action associated with that direction. If the orientation of the gesture is transverse to the orientation of the data records, individual data records are archived or deleted to a respective panel, of the four other panels, according to a direction of the gesture and a predefined action associated with that direction.

16 Claims, 6 Drawing Sheets

(56) References Cited

U.S. PATENT DOCUMENTS

2014/0331187 A1* 11/2014 Hicks ................... G06F 3/0488
  715/845
2015/0205844 A1* 7/2015 Eggebraaten ......... G06F 3/0488
  715/781

OTHER PUBLICATIONS

"Swipe an item in listView along finger", stackoverflow, Jul. 11, 2013, pp. 1-3, retrieved Jul. 18, 2013, <http://stackoverflow.com/questions/17593200/swipe-an-item-in-listview-along-finger>.

Mario Korf and Eugene Oksman; "Native, HTML5, or Hybrid: Understanding Your Mobile Application Development Options," pp. 1-4, <https://wiki.developerforce.com/page/Native,_HTML5,_or_Hybrid:_Understanding_Your_Mobile_Application_Development_Options>, retrieved Jul. 18, 2013.

"HTML table with fixed headers and a fixed first column for the iPhone", stackoverflow, Oct. 27, 2010, pp. 1-3, retrieved Jul. 18, 2013, <http://stackoverflow.com/questions/4015800/html-table-with-fixed-headers-and-a-fixed-first-column-for-the-iphone>.

"App Inventor Tutorials and Examples: Google Spreadsheet Database", Pura Vida Apps, pp. 1-9, retrieved Jul. 18, 2013, <http://puravidaapps.com/taifunGS.php>.

Shane Conder and Lauren Darcey; "Android User Interface Design: Layout Basics", Nov. 11, 2010, pp. 1-9, retrieved, Jul. 18, 2013, <http://mobile.tutsplus.com/tutorials/android/android-layout/>.

\* cited by examiner

CONSUMING DATA ON A TOUCHSCREEN DEVICE

BACKGROUND

The present disclosure relates to computer software, and more specifically, to computer software to consume data on a touchscreen device.

Traditionally, it has been difficult for a user to consume large amounts of data on a device with a limited screen size, such as a mobile phone or tablet. Such devices typically do not include a mouse or keyboard as a traditional computer does. As a user receives data results returned, for example, from a web browser or other application, the user may have to use the touchscreen to scroll through the results horizontally or vertically, which typically is tedious, error-prone, and frustrating for the user. Additionally, the user may have to view the entire result set at least once in order to determine which columns and rows are desirable and should be retained, and which columns and rows are irrelevant or undesirable, and should be discarded.

SUMMARY

Embodiments disclosed herein provide a system and computer program product to consume data on a touchscreen device, by generating a first arrangement of a first plurality of database records, each of the first plurality of database records being uniquely identifiable by a respective record identifier, outputting the first arrangement for display in a first panel on a touchscreen device, responsive to receiving a predefined gesture having an orientation matching an orientation of the first plurality of database records of the first arrangement on the touchscreen device: upon determining that a direction of the predefined gesture is in a first direction, moving the first arrangement to a second panel on the touchscreen device, thereby designating the first arrangement to be archived, and, upon determining that the direction of the predefined gesture is in a second direction, opposite to the first direction, moving the first arrangement to a third panel on the touchscreen device for deletion, and, responsive to receiving a predefined gesture having an orientation transverse to the orientation of the first plurality of database records of the first arrangement: upon determining that a direction of the predefined gesture is in a third direction, moving a first record, of the plurality of database records, selected by the predefined gesture, to a fourth panel on the touchscreen device, thereby designating the first record to be archived, and, upon determining that the direction of the predefined gesture is in a fourth direction, opposite to the third direction, moving the first record to a fifth panel on the touchscreen device for deletion.

DETAILED DESCRIPTION

Figure 1A:
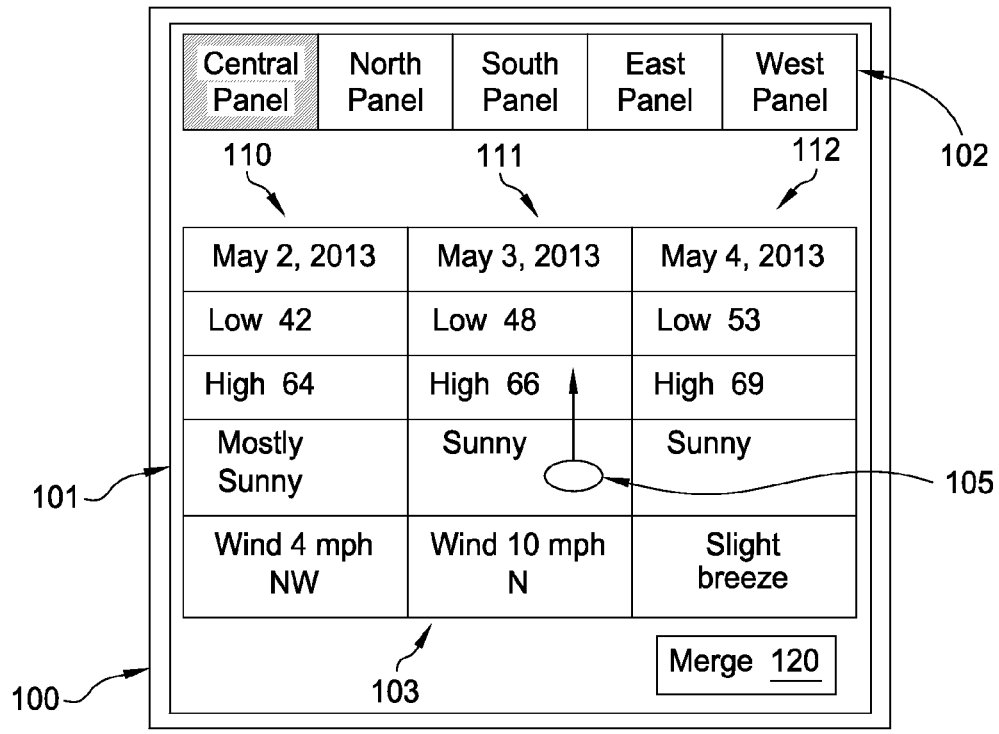
FIGS. 1A-1F illustrate techniques to consume data on a mobile device, according to one embodiment.

Embodiments disclosed herein provide techniques to allow users to easily consume data on a touch-screen device. Generally, a distributed table layout is provided in a native mobile application that is capable of accepting HTML or XML (or any other structured language) as input to a central table, with the central table being displayed in a main panel (or frame) of the application. The central table is used for displaying consumed results as the user moves through the data by swiping rows and columns that are needed or not needed. Additionally, multiple tables are created inside of linked panels, that are not initially displayed to the user. In at least some embodiments, four linked panels are provided, each panel capable of receiving table data from the central table. Furthermore, each of the panels may be linked to a particular direction, such as north (up), south (down), east (right), and west (left) for the first, second, third, and fourth linked panels, respectively. When a user swipes data in one of these directions, a predefined operation may be performed on the data. Such a configuration is for illustrative purposes, and should not be considered limiting, as the disclosure contemplates any feasible configuration.

The data may be formatted in an arrangement in the central table according to a columnar (vertical) orientation or a row (horizontal) orientation. In the columnar orientation, a plurality of records sharing the same unique identifier (such as a database key) occupy a single column, with each new column belonging to data records sharing a unique identifier. In the columnar orientation, therefore, a row corresponds to a set of values for a particular attribute (such as a database column). In the row orientation, the plurality of records sharing the same unique identifier (such as a database key) occupy a single row, with each new row belonging to data records each sharing the unique identifier. Also, therefore, in the row orientation, a column corresponds to a set of values for a particular attribute (such as a database column). Generally, when the orientation of a swipe gesture matches the orientation of the data, the predefined operation may be performed on the set of records sharing the unique identifier. When the orientation of the gesture is perpendicular to the orientation of the data, the predefined operation may be performed on the set values for an attribute across multiple unique identifiers. For the sake of simplicity, embodiments disclosed herein will be described using the columnar orientation, although the described techniques apply equally to the row orientation and any other feasible orientation.

Each panel may serve a particular function. For example, the north panel (and corresponding linked table) may be configured to collect and store data columns for archival, or later retrieval, by the user. In such a scenario, a user wishing to archive a column may swipe the column to the "north," or up, on his screen. The south panel, on the other hand, may be used to collect columns that are not of any interest to the user. The user may "delete" these columns by swiping the columns to the "south," or down, on his screen. Although the term "delete" may be used herein, the data may not be deleted in at least some embodiments. The east panel may be used to collect rows for archival or later viewing. The user may archive these rows by swiping the rows to the right. The west panel may be used to collect rows that are not of any interest. The user may "delete" these rows by swiping them to the left. Although any number of configurations is contemplated, embodiments disclosed herein will be discussed using this north/south/east/west configuration for clarity.

Embodiments disclosed herein therefore allow users to visually consume data from the central panel, and swipe rows or columns to one or more of the tables in the linked panels, while the central panel keeps elevating new data into view from the bottom and condensing from the right. After all the data has been consumed by the user, embodiments disclosed herein allow the user to choose to merge all four panels into the central panel, only to consume the data once again. Or, the user may, from the central panel, choose to share, store, or invoke some other event within the results. A "merge" operation may remove data from the west and south panels, and add intersected data from the north and east panels into the central table. The merge operation may or may not clear the central panel before populating it with data from the north and east panels. Such a determination will depend on the application of this design. The examples included herein demonstrate usage as if the central panel is being cleared. The merge operation may or may not also clear the data from the four linked panels. The "merge" feature allows the user to view relevant results, and if desired, begin swiping those results to different panels once again. The merge operation may be activated using a zoom-in gesture, button, or event driven UI component.

Embodiments disclosed herein also allow users to select one of the linked panels and swipe any data therein back to the central panel. If rows are swiped back to the central panel, they are placed at the beginning of the table, but only intersecting data will be viewed. Likewise, if columns are swiped back to the central panel, only intersecting data is shown. However, from the central panel, the data is also allowed to be swiped to a different panel. If a user wishes, they may issue a command to view the status of all data, in which case, the central panel may display all data that has been swiped, and provide an indication as to whether it was marked as relevant or irrelevant.

Additionally, a two-finger swipe may be used in order to move multiple rows or columns. For example, the user may place two fingers on two different rows, and all rows between the fingers (and the two rows touched by the fingers) may be highlighted, and can be swiped east or west. Likewise, two fingers can be placed on two columns in the central table, and all columns between the fingers (and the two columns touched by the fingers) may be highlighted, and may be swiped north or south.

The display which displays the data can be any variety of interactive display technologies that allow users to interact with the display using an electronic pen, a stylus, a finger or other input element/device. By way of example, the underlying mechanism for interacting with the display can be electromagnetic, capacitive, resistive, etc. For purposes of illustration, embodiments will be described herein with respect to a touch sensitive display whereby a user may interact with the display via capacitive coupling (in which the user forms one electrode in a circuit) or via a resistive system in which the pressure applied to the screen by the user's finger urges the screen into contact with an underlying conducting plate thereby registering the contact of the finger at a particular location on the display. In any case, the particular underlying interactive display technology is not limiting of the disclosure.

FIG. 1A depicts a mobile device 100 implementing techniques to consume data, according to one embodiment. The mobile device 100 includes a touchscreen display 101. An application is executing on the mobile device, and generates the output depicted on the touchscreen display 101. A user of the application may toggle between a plurality of panels (also referred to as tables and frames) using the panel selector 102. In FIG. 1A, the user has selected central panel, which is the main panel used to consume data, such as database data. The central panel includes the central table 103. In FIG. 1A, the application may have determined that the touchscreen display 101 is able to display a table including five rows and three columns. The application may determine the number of rows and columns based on one or more of the size of the touchscreen display, the current font size, the operating system of the mobile device, and any other parameter affecting display on the touchscreen display 101.

As shown, the table 103 includes three columns 110, 111, and 112. The data in the columns 110-112 is example weather data for three given dates, May 2-4, 2013, and may be obtained from a local or remote file, database, or the like, or may be obtained from a local or remote application. The columns of the table 103 include the date as a unique identifier (such as a database key), and the subsequent rows include a low temperature, high temperature, weather description, and wind conditions for the date. For example, the high temperature on May 2, 2013 was 64 degrees, while May 3, 2013 had a low of 48 degrees, and May 4, 2013 had sunny conditions with a light breeze. Although not shown, a respective heading may be displayed at the top of each column 110-112 (such as C1, C2, and C3, respectively).

When a user places a finger at a location 105 on the touchscreen display 101 and issues a upward swipe gesture (as indicated by the upward arrow), embodiments disclosed herein move the column 111 to a north panel used to store relevant data. Conversely, if the user swiped downwards, the column 111 may be moved to the south panel used to receive irrelevant data. A merge button 120 is available for user selection. When the merge button 120 is selected, central panel is cleared out, and all archived data in the north and east panels is intersected and displayed in table 103. The data from the linked panels may also be cleared upon merging, in some embodiments.

Figure 1B:
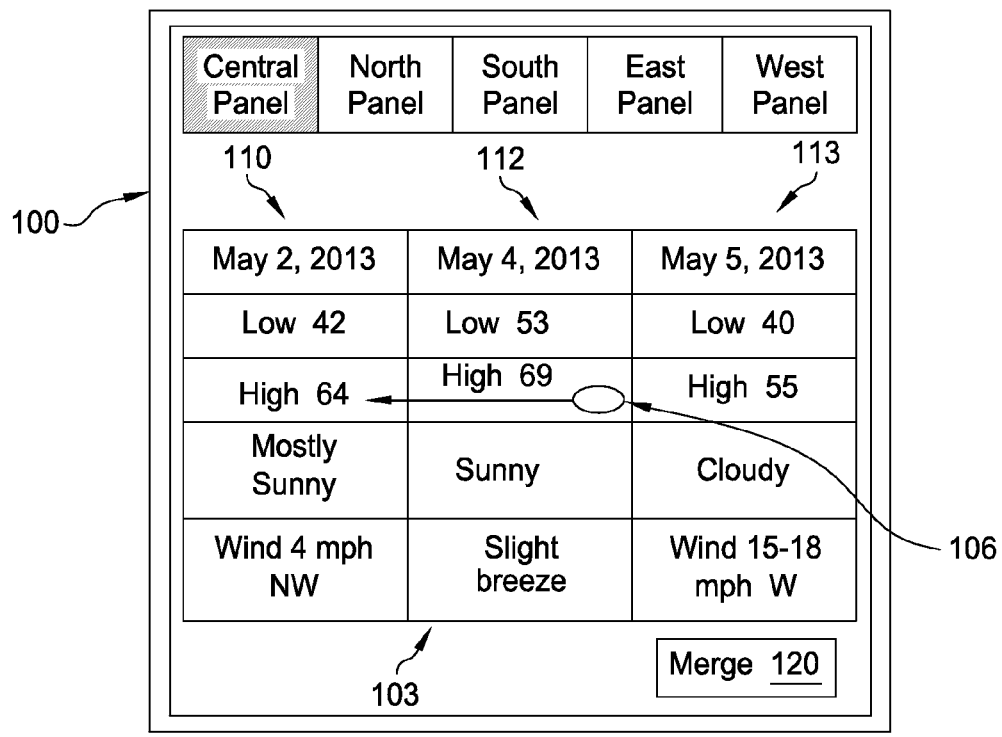

FIG. 1B depicts the state of the table 103 after the user swipes column 111 to the north, according to one embodiment. As shown, the column 111 is no longer depicted in table 103, and a new column 113 has been added to the table 103. Also, FIG. 1B depicts the user swiping the high temperatures to the west panel, starting from point 106. Once the user swipes the row of daily high temperatures to the west, the row of high temperatures is moved to the west panel for archival, and is no longer displayed in the table 103.

Figure 1C:
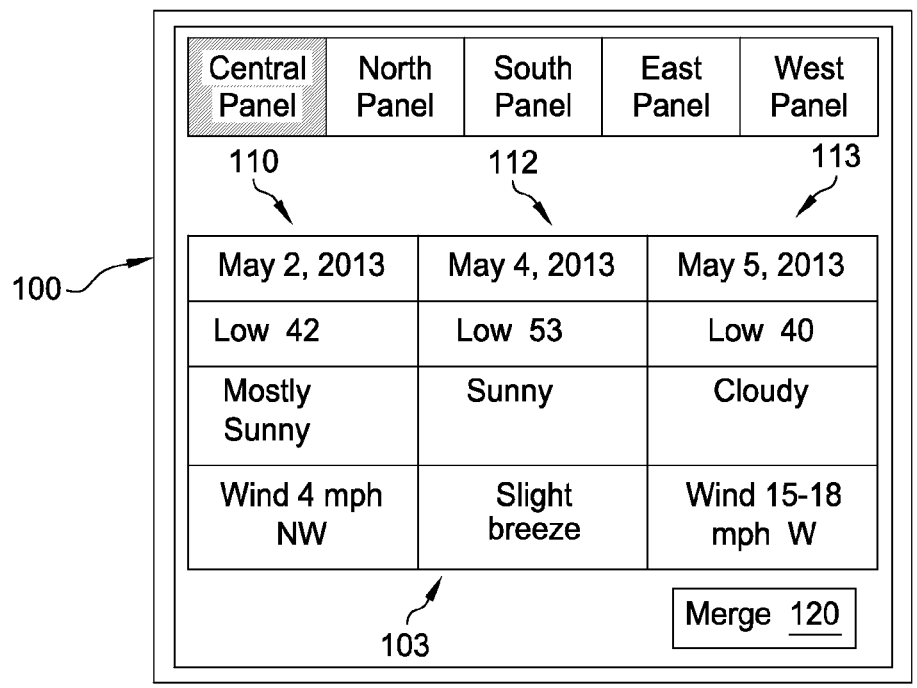

FIG. 1C depicts the state of the table 103 after the user swipes the row of high temperatures to the west, according to one embodiment. As shown, the table 103 includes columns 110-113, but no longer includes the row of daily high temperatures. If additional rows of data were previously not depicted in the table due to lack of space on the touchscreen display 101, in one embodiment, an additional row may be depicted in table 103, as additional space has been made available by archiving the row of high temperatures.

Figure 1D:
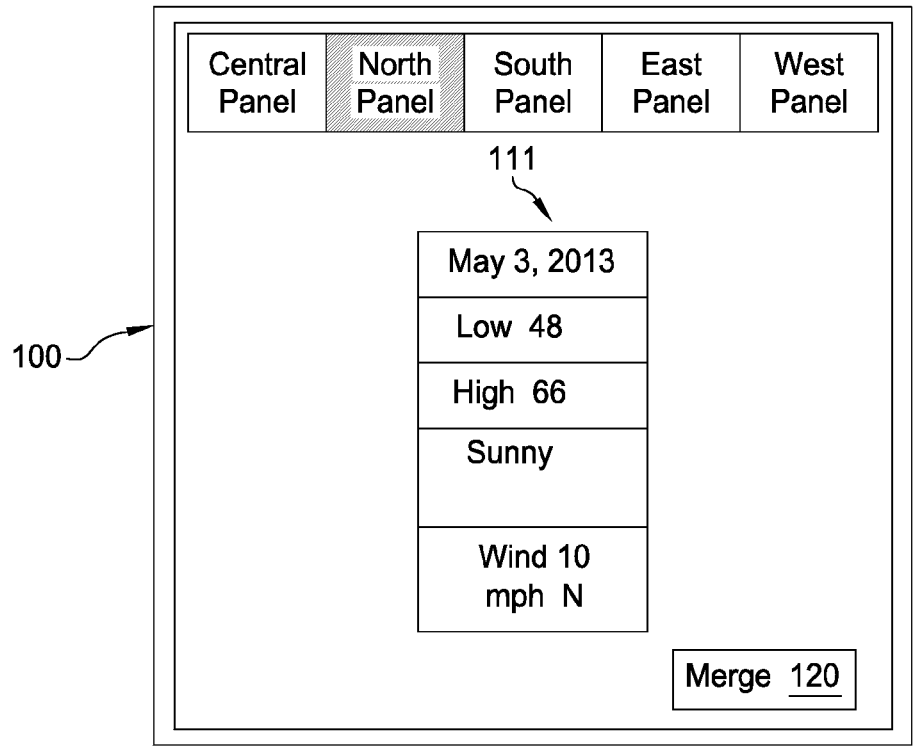

FIG. 1D depicts the state of north panel, according to one embodiment. As shown, the user has selected north panel for display. As previously indicated, the north panel corresponds to an archival location for relevant data. When the user selects the merge button 120, data in the north panel (and the east panel) is moved back to the central panel for display. As shown, the north panel includes the column 111, which was swiped to the north panel by the user in FIG. 1A. As more columns are swiped upward by the user, the columns may be displayed in north panel along with the column 111.

Figure 1E:
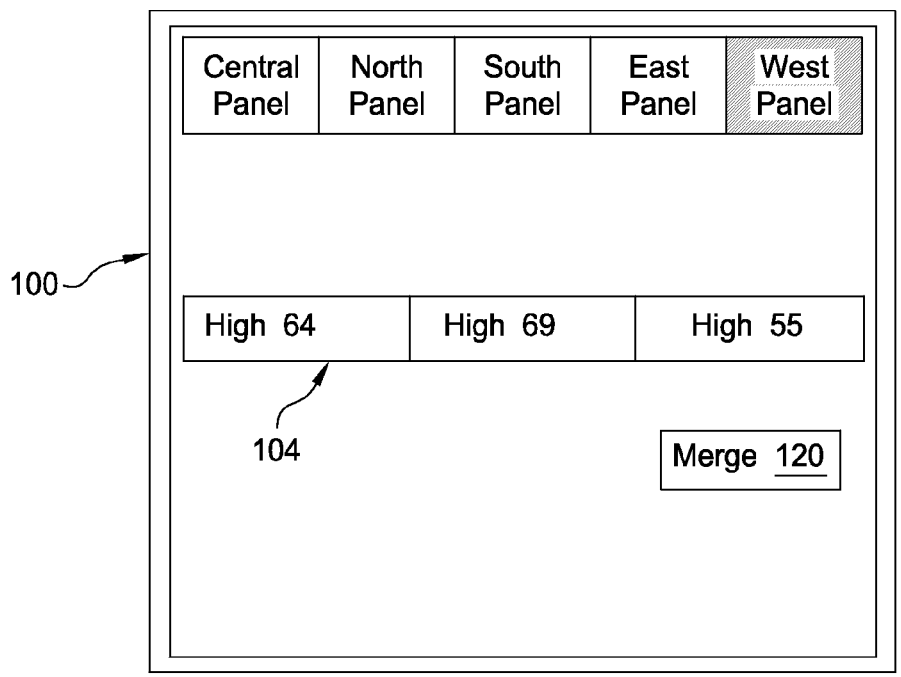

FIG. 1E depicts the state of the west panel, according one embodiment. As shown, the user has selected the west panel for display, which includes the row of high temperatures 104 swiped to the west by the user in FIG. 1B. The west panel, as previously indicated, is used to store irrelevant, undesired data, such as the row of high temperatures 104. When the user clicks the merge button 120, data from the west (and south) panel will not be populated in the central panel.

Figure 1F:
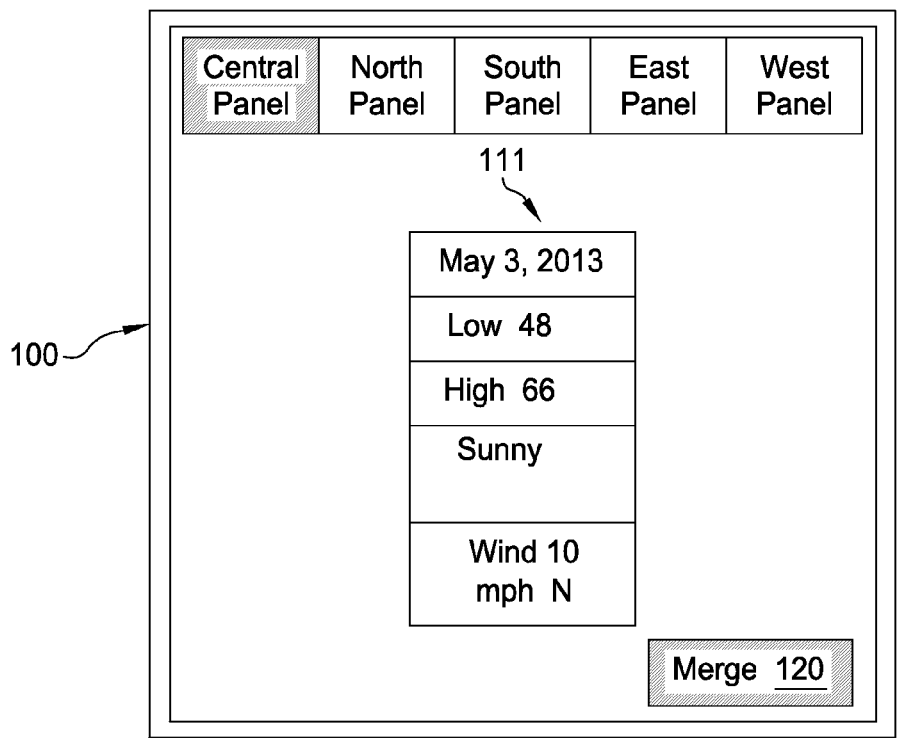

FIG. 1F depicts the state of the central panel after the user selected the merge button 120. As shown, the central panel only includes the column 111, as it was the only row or column sent to an archival panel (north or east) by the user. The columns 110 and 112-113 have been removed from the central panel, and the data from the north, south, east, and west panels may have been removed. At this point, the user may perform additional operations on the column 111, such as swiping the column up or down, or swiping individual rows left or right, at which point the data will be moved to the corresponding panel.

Figure 2:
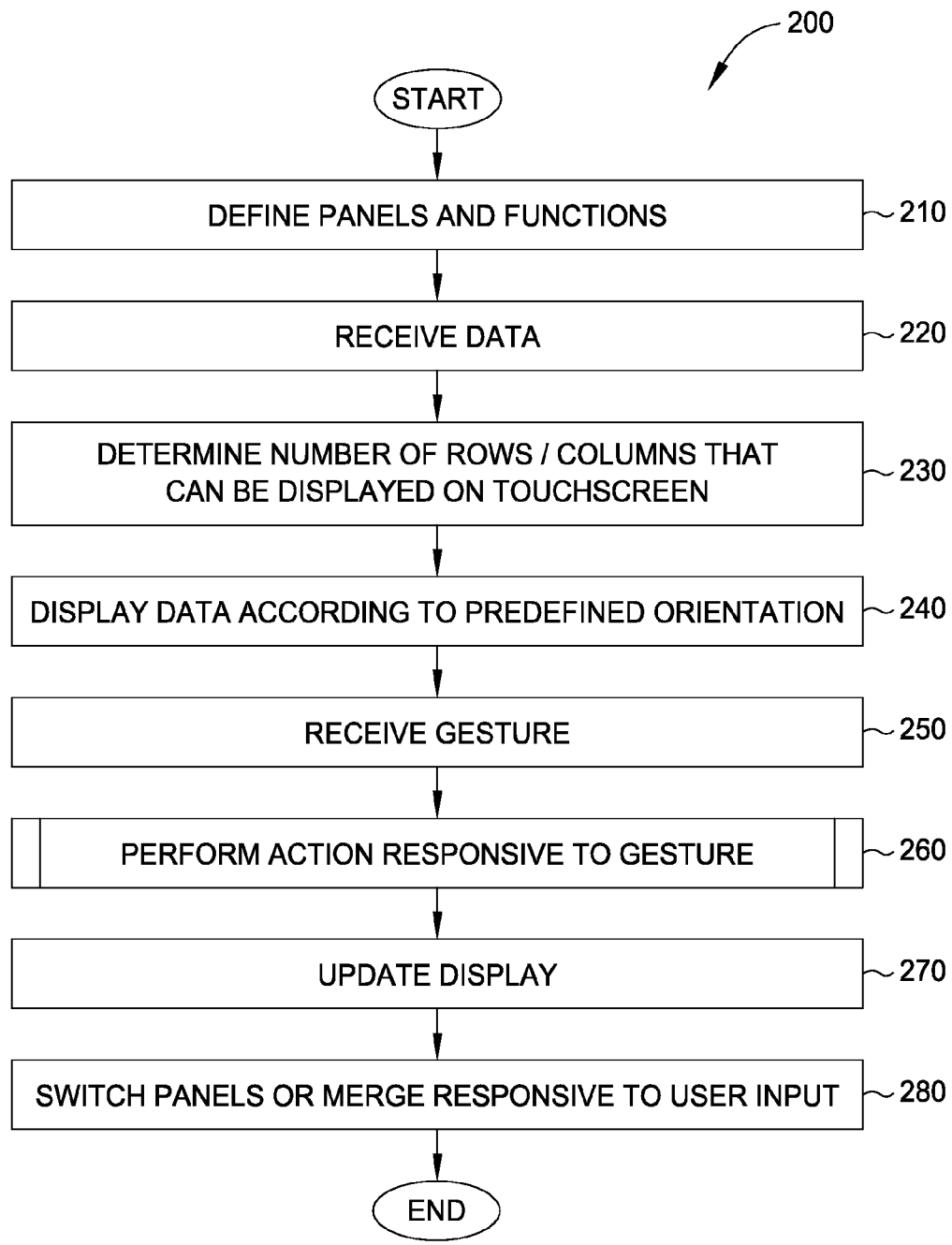
FIG. 2 illustrates a method to consume data on a mobile device, according to one embodiment.

FIG. 2 illustrates a method 200 to consume data on a mobile device, according to one embodiment. Generally, the method 200 provides a central table that displays data results to a user, who may then move the data to one or more linked tables, with each of the linked tables having a corresponding function. For example, in embodiments where the central table displays data results in a columnar orientation, four linked tables may be provided, with a north table serving as an archival store for relevant column data, while the south column is used for column data that a user considers irrelevant. An east and west table may be provided to receive relevant and irrelevant row data, respectively.

At step 210, linked panels and their functions may be defined in a native application supporting tables. In one embodiment, a user defines the panels and their functions. In another embodiment, the panels and their functions are programmatically defined. Defining the panels includes creating a number of linked tables that correspond to a particular panel and a "direction" in which the panels reside (such as north, south, east, and west). The function indicates the type of storage the corresponding panels (and their linked tables) are used for. More specifically, the function may indicate whether the panel is for relevant or irrelevant data. In such cases, data sent to these panels may be archived for later retrieval, or marked as irrelevant (and possibly discarded), respectively. Generally, layouts of the panels may be created with XML or programmatically. Table I illustrates one such XML implementation in the Android™ mobile operating system (Android is a trademark of Google Inc.):

TABLE I

```
<?xml version="1.0" encoding="utf-8"?>
<DistributedTableLayout
    xmlns:android="http://schemas.android.com/apk/res/android"
    android:id="@+id/tableLayout1"
    android:layout_width="match_parent"
    android:layout_height="match_parent"
    android:shrinkColumns="*"
    android:stretchColumns="*">
    <NorthView android:swipeback="true" android:enabled="true"
android:multiswipeCol="true" android:archive="true">
        <TextView
            android:id="@+id/textView9"
            android:layout_width="match_parent"
            android:layout_height="wrap_content"
            android:textStyle="bold"
            android:typeface="serif"
            android:textSize="18dp" android:text="Saved Columns"
            android:gravity="center">
        </TextView>
    </NorthView>
    <SouthView android:swipeback="true" android:enabled="true"
android:multiswipeCol="true" android:deleteEnabled="true" android:archive="false">
        <TextView
            android:id="@+id/textView9"
            android:layout_width="match_parent"
            android:layout_height="wrap_content"
            android:textStyle="bold"
            android:typeface="serif"
            android:textSize="18dp" android:text="Removed Columns"
            android:gravity="center">
        </TextView>
    </SouthView>
    <EastView android:swipeback="true" android:enabled="true"
android:multiswipeRow="true" android:archive="true">
        <TextView
            android:id="@+id/textView9"
            android:layout_width="match_parent"
            android:layout_height="wrap_content"
            android:textStyle="bold"
            android:typeface="serif"
            android:textSize="18dp" android:text="Saved Rows"
            android:gravity="center">
        </TextView>
    </EastView>
    <WestView android: swipeback="true" android:enabled="true"
android:multiswipeRow="true" android:deleteEnabled="true" android:archive="false">
        <TextView
            android:id="@+id/textView9"
            android:layout_width="match_parent"
            android:layout_height="wrap_content"
            android:textStyle="bold"
            android:typeface="serif"
```

TABLE I-continued

```
            android:textSize="18dp" android:text="Removed Rows"
            android:gravity="center">
        </TextView>
    </WestView>
    <CentralView android:multiswipeRow="true" android:multiswipeCol="true"
android:mergeEnabled="true" android:preserveUnmountedData = false>
        <TableRow
            android:id="@+id/tableRow4"
            android:layout_height="wrap_content"
            android:layout_width="match_parent"
            android:gravity="center_horizontal>
            <TextView
                android:id="@+id/textView9"
                android:layout_width="match_parent"
                android:layout_height="wrap_content"
                android:textStyle="bold"
                android:typeface="serif"
                android:textSize="18dp" android:text="Product Table"
                android:gravity="center" android:layout_span="6">
            </TextView>
        </TableRow> <TableRow
            android:id="@+id/tableRow1"
            android:layout_height="wrap_content"
            android:layout_width="match_parent">
            <TextView
                android:id="@+id/TextView04"
                android:text=""></TextView>
            <TextView
                android:id="@+id/TextView04"
                android:text="Feb 7"
                android:textStyle="bold"
                android:typeface="serif"></TextView>
            <TextView
                android:id="@+id/TextView03"
                android:text="Feb 8"
                android:textStyle="bold"
                android:typeface="serif"></TextView>
            <TextView
                android:id="@+id/TextView02"
                android:text="Feb 9"
                android:textStyle="bold"
                android:typeface="serif"></TextView>
            <TextView
                android:id="@+id/TextView01"
                android:text="Feb 10"
                android:textStyle="bold"
                android:typeface="serif"></TextView>
            <TextView
                android:text="Feb 11"
                android:id="@+id/textView1"
                android:textStyle="bold"
                android:typeface="serif"></TextView>
        </TableRow>
        <TableRow
            android:layout_height="wrap_content"
            android:id="@+id/tableRow2"
            android:layout_width="match_parent">
            <TextView
                android:text="Day High"
                android:id="@+id/textView2"
                android:textStyle="bold"></TextView>
            <TextView
                android:id="@+id/textView3"
                android:text="28°F"
                android:gravity="center_horizontal"></TextView>
            <TextView
                android:text="26°F"
                android:id="@+id/textView4"
                android:gravity="center_horizontal"></TextView>
            <TextView
                android:text="23°F"
                android:id="@+id/textView5"
                android:gravity="center_horizontal"></TextView>
            <TextView
                android:text="17°F"
                android:id="@+id/textView6"
                android:gravity="center_horizontal"></TextView>
```

TABLE I-continued

```
    <TextView
        android:text="19°F"
        android:id="@+id/textView7"
        android:gravity="center_horizontal"></TextView>
    </TableRow>
    <TableRow
        android:layout_height="wrap_content"
        android:id="@+id/tableRow2"
        android:layout_width="match_parent">
    <TextView
        android:text="Day Low"
        android:id="@+id/textView2"
        android:textStyle="bold"></TextView>
    <TextView
        android:text="15°F"
        android:id="@+id/textView3"
        android:gravity="center_horizontal"></TextView>
    <TextView
        android:text="14°F"
        android:id="@+id/textView4"
        android:gravity="center_horizontal"></TextView>
    <TextView
        android:text="3°F"
        android:id="@+id/textView5"
        android:gravity="center_horizontal"></TextView>
    <TextView
        android:text="5°F"
        android:id="@+id/textView6"
        android:gravity="center_horizontal"></TextView>
    <TextView
        android:text="6°F"
        android:id="@+id/textView7"
        android:gravity="center_horizontal"></TextView>
    </TableRow>
    <TableRow
        android:id="@+id/tableRow3"
        android:layout_height="wrap_content"
        android:layout_width="match_parent"
        android:gravity="center">
    <TextView
        android:id="@+id/textView8"
        android:text="Conditions"
        android:textStyle="bold"></TextView>
    <ImageView
        android:id="@+id/imageView1"
        android:src="@drawable/hot"></ImageView>
    <ImageView
        android:id="@+id/imageView2"
        android:src="@drawable/pt_cloud"></ImageView>
    <ImageView
        android:id="@+id/imageView3"
        android:src="@drawable/snow"></ImageView>
    <ImageView
        android:id="@+id/imageView4"
        android:src="@drawable/lt_snow"></ImageView>
    <ImageView
        android:id="@+id/imageView5"
        android:src="@drawable/pt_sun"></ImageView>
    </TableRow>
    </CentralView>
</DistributedTableLayout>
```

At step 220, the application receives data from a data source. The data source may be a file, database, web page, or any other local or remote source of data. The data may be formatted according to one or more predefined formats, including, but not limited to, HTML and XML.

At step 230, the application determines the size of a table that can be displayed on a touchscreen display. The size of the table, which in one embodiment, is defined by a number of rows and columns, may be based on one or more of the size of the computing device's touchscreen display, font size, operating system settings, and the like. At step 240, the application may display, in a central panel, a first arrangement of data according to a predefined orientation. The predefined orientation may be columnar or row-based. At step 250, the application receives a touchscreen gesture from a user which covers one or more items of displayed data. In one embodiment, the gesture is a swipe. The gesture may be made with one or two fingers. At step 260, the application performs an action on the selected data. Generally, the action comprises moving the selected data to a different panel based on a direction of the gesture.

At step 270, the application updates the display of data in the central panel. Generally, in updating the display, the application removes the data swiped at step 250, and if additional, undisplayed data exists, the application may update the display to include the undisplayed data. At step 280, the application may display a different panel or merge the data from the panels responsive to user input specifying to do so. In merging the data, the application may (depending on settings) clear the central panel and the irrelevant (west and south) panels, and present an intersected archived data set from the relevant (north and east) panels. In general, the application may receive any number of gestures from the user, and the relevant steps of the method 200 may be repeated responsive to the user input in such cases. In one embodiment, the user provides gestures until all data in the central panel is consumed and moved by the application to the relevant panels.

Figure 3:
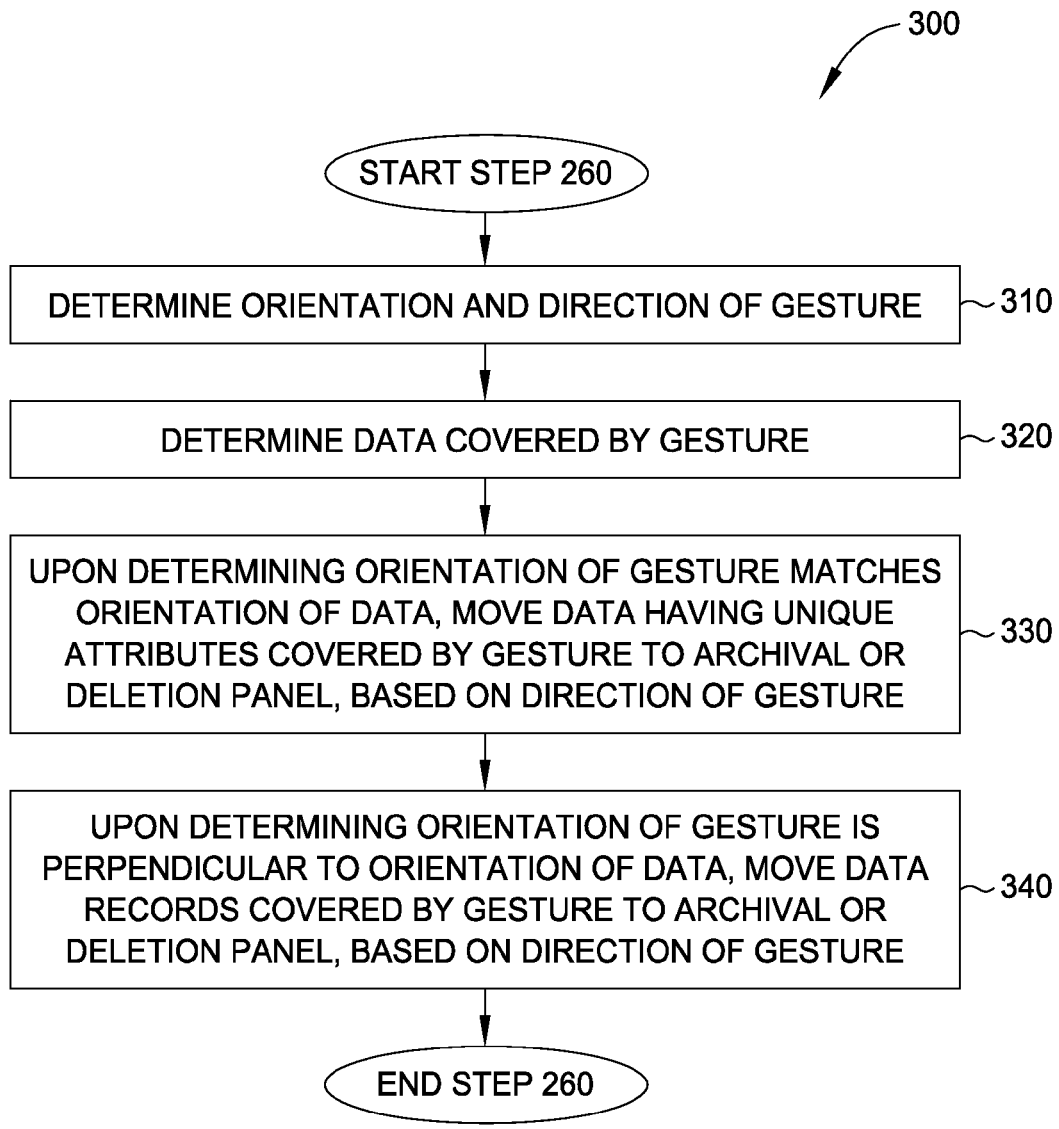
FIG. 3 illustrates a method to perform an action responsive to a gesture, according to one embodiment.

FIG. 3 illustrates a method 300 corresponding to step 260 to perform an action responsive to a gesture, according to one embodiment. Generally, the application executes the steps of the method 300 in order to determine which panel to send data to, what data to send, and what to do with the data when it is sent to the correct panel. At step 310, the application determines the orientation and direction of the gesture using data provided by the touchscreen display. At step 320, the application determines the data covered by the gesture. If the gesture is made with one finger, a single row or column is covered by the gesture. If the gesture is made with two fingers, the rows or columns touched by the fingers, as well as any rows or columns between the fingers, are covered by the gesture.

At step 330, the application, upon determining that the orientation of the gesture matches the orientation of the data, moves the data having unique attributes covered by the gesture to an archival or deletion panel, based on direction of gesture. If the orientation of the gesture matches the orientation of the data, then one or more sets of data sharing a respective unique identifier have been selected by the user. Based on the direction of the gesture, the application may move the data to the corresponding panel. If, for example, in a columnar orientation, the user swipes a column upward, and the north panel is defined as a relevant, archival panel, the application may move the column to the north panel for future retrieval. Conversely, if the column is swiped downward, the user considers the data column irrelevant, and moves the data to the south panel for collection. At step 340, the application, upon determining that the orientation of the gesture is perpendicular to the orientation of data, moves data records covered by the gesture to the archival or deletion panel, based on the direction of the gesture. If, for example, in a columnar orientation, the user swipes a row to the right, and the east panel is defined as a relevant, archival panel, the application may move the row to the east panel for future retrieval. Conversely, if the row is swiped to the left, the user considers the row of data irrelevant, and moves the data to the west panel. Data stored in the west and south panels may ultimately be deleted or may be remain unmodified until the final merge or rejoining of all affected data.

Figure 4:
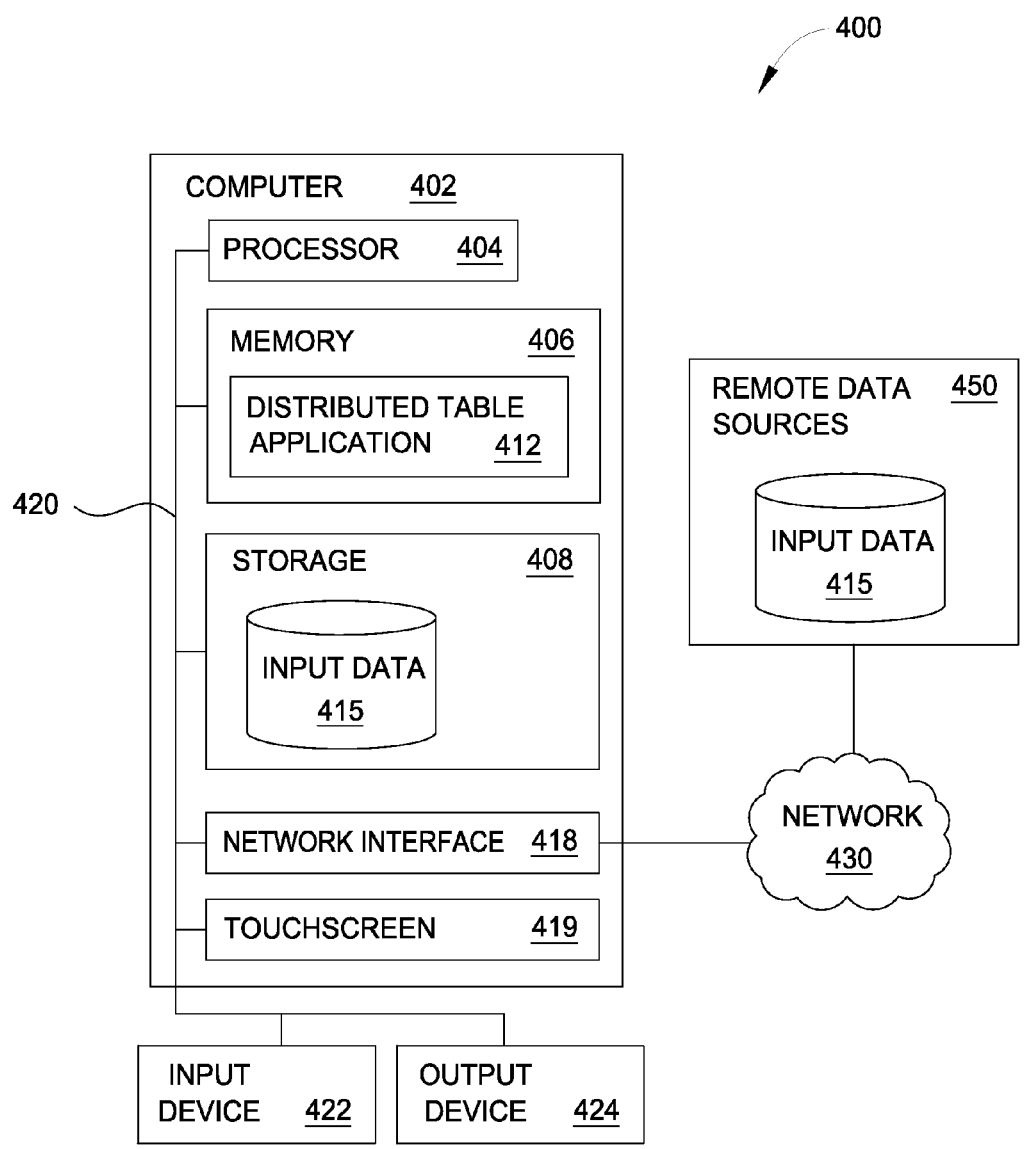
FIG. 4 illustrates a system to consume data on a mobile device, according to one embodiment.

FIG. 4 illustrates a system 400 to consume data on a mobile device, according to one embodiment. The networked system 400 includes a computer 402. The computer 402 may be any computing device which has a touch screen display, including, but not limited to phones, tablets, laptops, computer monitors, personal digital assistants, and the like. The computer 402 may also be connected to other computers via a network 430. In general, the network 430 may be a telecommunications network and/or a wide area network (WAN). In a particular embodiment, the network 430 is the Internet.

The computer 402 generally includes a processor 404 connected via a bus 420 to a memory 406, a touchscreen 416, a network interface device 418, a storage 408, an input device 422, and an output device 424. The computer 402 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 404 is included to be representative of a single CPU, multiple CPUs, a single CPU having multiple processing cores, and the like. The network interface device 418 may be any type of network communications device allowing the computer 402 to communicate with other computers via the network 430.

The storage 408 may be a persistent storage device. Although the storage 408 is shown as a single unit, the storage 408 may be a combination of fixed and/or removable storage devices, such as fixed disc drives, solid state drives, SAN storage, NAS storage, removable memory cards or optical storage. The memory 406 and the storage 408 may be part of one virtual address space spanning multiple primary and secondary storage devices.

The input device 422 may be any device for providing input to the computer 402. For example, a keyboard and/or a mouse may be used. The output device 424 may be any device for providing output to a user of the computer 402. For example, the output device 424 may be any conventional display screen or set of speakers. Although shown separately from the input device 422, the output device 424 and input device 422 may be combined. For example, a display screen with an integrated touch-screen may be used. In some embodiments, some functionality of the input device 418 and the output device 420 may be combined into the touchscreen 416. The touchscreen 416 is an electronic visual display that can detect the presence and location of a touch within the display area. Therefore, the touchscreen 416 can display user interface elements to the user and directly receive user input when the user touches the touchscreen 416 with a finger or the like.

As shown, the memory 406 contains the distributed table application 412, which is an application generally configured to allow a user to consume data on a touchscreen device. The distributed table application 412 may provide a central table that displays data records received from the input data 415. The distributed table application 412 may also generate a plurality of linked tables, not initially displayed on the touchscreen device, where the user may swipe data records to. Each of the linked tables may be predefined to store relevant data for later retrieval, or as temporary storage location for irrelevant data. For example, in a columnar data configuration, a north panel may have a linked table used to archive relevant columns for later retrieval or viewing. A south panel may have a linked table used to collect columns that are not of any interest to the user. An east panel may have a linked table used to archive rows for later retrieval or viewing. A west panel may have a linked table used to collect rows that are not of any interest to the user. The following tables may describe the functionality of the distributed table application 412. Table II shows a central table with four of seven columns of data displayed due to the limited space available on the touchscreen display:

TABLE II

| C1 | C2 | C3 | C4 |
|---|---|---|---|
| May 10th | May 11th | May 12th | May 13th |
| Low 42 | Low 48 | Low 53 | Low 40 |
| High 64 | High 66 | High 69 | High 55 |
| Mostly Sunny | Sunny | Sunny | Cloudy |
| Wind 4 mph NW | Wind 10 mph N | Slight breeze | Wind 15-18 W |

As shown, Table II includes weather data for multiple dates. If the user swipes C3 to the south, the central panel is updated as depicted in Table III:

TABLE III

| C1 | C2 | C4 | C5 |
|---|---|---|---|
| May 10th | May 11th | May 13th | May 14th |
| Low 42 | Low 48 | Low 40 | Low 43 |
| High 64 | High 66 | High 55 | High 59 |
| Mostly Sunny | Sunny | Cloudy | Sunny |
| Wind 4 mph NW | Wind 10 mph N | Wind 15-18 W | Wind 2 mph N |

As shown, Table III no longer includes C3, but now includes C5. Table IV illustrates the current status of the south (deletion) panel:

TABLE IV

| C1 | C2 | C3 | C4 |
|---|---|---|---|
|  |  | May 12th |  |
|  |  | Low 53 |  |
|  |  | High 69 |  |
|  |  | Sunny |  |
|  |  | Slight breeze |  |
|  |  | 0% chance rain |  |
|  |  | dew point 54 |  |

As shown in Table IV, the data from C3 is the only data set that has been moved to the south. Placeholders for C1, C2, and C4 are depicted, but in some embodiments, no placeholders are provided, and only C3 and its data are shown. Additionally, two extra rows are depicted in the south panel, as the distributed table application 412 has determined that the available screen size can accommodate the extra rows. Table V illustrates the state of the central table if the second row (low temperatures) has been swiped to the west panel:

TABLE V

| C1 | C2 | C4 | C5 |
|---|---|---|---|
| May 10th | May 11th | May 13th | May 14th |
| High 64 | High 66 | High 55 | High 59 |
| Mostly Sunny | Sunny | Cloudy | Sunny |
| Wind 4 mph NW | Wind 10 mph N | Wind 15-18 W | Wind 2 mph N |
| 25% chance rain | 0% chance rain | 35% chance rain | 33% chance rain |

In Table V, the central panel no longer includes the daily low temperatures, but now includes the daily percentage chance of rain, due to the space made available after removing the daily low temperatures. Table VI shows the state of the west panel:

TABLE VI

| C1 | C2 | C3 | C4 | C5 |
|---|---|---|---|---|
| Low 42 | Low 48 |  | Low 40 | Low 43 |

In Table VI, the west panel includes the low temperature data, which the user has deemed to be irrelevant. Table VI, however, does not include data for C3, as it has previously been swiped to the south panel. Table VI does include low temperature data for C6 and C7, but it is not depicted due to the hypothetical screen size constraints. In a subsequent merge operation, the data from Table VI will not be displayed in the central panel. Table VII depicts the central panel if the user swipes the high temperature row to the east panel:

TABLE VII

| C1 | C2 | C4 | C5 |
|---|---|---|---|
| May 10th | May 11th | May 13th | May 14th |
| Mostly Sunny | Sunny | Cloudy | Sunny |
| Wind 4 mph NW | Wind 10 mph N | Wind 15-18 W | Wind 2 mph N |
| 25% chance rain | 0% chance rain | 35% chance rain | 33% chance rain |
| Dew point 45 | Dew point 48 | Dew point 44 | Dew point 50 |

As shown in Table VII, the daily high temperatures have been consumed, and are no longer displayed. A new row, for daily dew points is now displayed, due to the freed space made available after moving the daily high temperatures. Table VIII depicts a current state of the east panel:

TABLE VIII

| C1 | C2 | C3 | C4 | C5 |
|---|---|---|---|---|
| High 64 | High 66 |  | High 55 | High 59 |

As shown in Table VIII, the east panel includes the high temperatures swiped by the user, with the exception of C3, which was previously deleted by moving to the south panel. The high temperatures for C6 and C7, not depicted due to hypothetical screen size constraints, are also moved to the east panel. Table IX depicts the state of the central panel if the row for percentage chance of rain is moved to the east panel:

TABLE IX

| C1 | C2 | C4 | C5 |
|---|---|---|---|
| May 10th | May 11th | May 13th | May 14th |
| Mostly Sunny | Sunny | Cloudy | Sunny |
| Wind 4 mph NW | Wind 10 mph N | Wind 15-18 W | Wind 2 mph N |
| Dew point 45 | Dew point 48 | Dew point 44 | Dew point 50 |

As shown in Table IX, the central panel no longer includes the daily percentage chance of rain. Table X depicts the state of the east panel:

TABLE X

| C1 | C2 | C3 | C4 | C5 |
|---|---|---|---|---|
| High 64 | High 66 |  | High 55 | High 59 |
| 25% chance rain | 0% chance rain |  | 35% chance rain | 33% chance rain |

As shown in Table X, the east panel includes the daily high temperatures and percentage chance of rain for C1-C2 and C4-C5. It also includes these values for C6 and C7, which are not displayed in Table X due to the hypothetical screen size constraints of the touchscreen display 416. Table XI depicts the state of the central panel if the user swipes C2 to the north panel from the central panel:

TABLE XI

| C1 | C4 | C5 | C6 |
|---|---|---|---|
| May 10th | May 13th | May 14th | May 15th |
| Mostly Sunny | Cloudy | Sunny | Rainy |
| Wind 4 mph NW | Wind 15-18 W | Wind 2 mph N | No wind |
| Dew point 45 | Dew point 44 | Dew point 50 | Dew point 40 |

As shown in Table XI, the central panel no longer includes C2, but now includes C6. Table XII depicts a current state of the north panel:

TABLE XII

| C1 | C2 | C3 | C4 |
|---|---|---|---|
|  | May 11th |  |  |
|  | Sunny |  |  |
|  | Wind 10 mph N |  |  |
|  | Dew point 48 |  |  |

As shown in Table XII, the north panel includes the date, weather conditions, wind conditions, and dew point for C2. The high and low temperatures are not depicted as they were previously swiped by the user. Generally, the north panel includes the data that was depicted in the central panel at the time the user swiped C2 to the north panel. Table XIII depicts the state of the central panel after the user swipes the dew point row to the west panel:

TABLE XIII

| C1 | C4 | C5 | C6 |
|---|---|---|---|
| May 10th | May 13th | May 14th | May 15th |
| Mostly Sunny | Cloudy | Sunny | Rainy |
| Wind 4 mph NW | Wind 15-18 W | Wind 2 mph N | No wind |

As shown in Table XIII, the central panel no longer includes the dew point row. The state of the west panel is depicted in Table XIV:

TABLE XIV

| C1 | C2 | C3 | C4 | C5 |
|---|---|---|---|---|
| Low 42 | Low 48 |  | Low 40 | Low 43 |
| Dew point 45 |  |  | Dew point 44 | Dew point 50 |

As shown in Table XIV, the west panel includes low temperatures and dew points. Assuming the user swipes columns C1, C4, C5, C6, and C7 to the south, consuming all data, the central panel will no longer contain any data. The condensed south panel would appear as shown in Table XV:

TABLE XV

| C1 | C2 | C3 | C4 |
|---|---|---|---|
| May 10th |  | May 12th | May 13th |
|  |  | Low 53 |  |
|  |  | High 69 |  |

TABLE XV-continued

| C1 | C2 | C3 | C4 |
|---|---|---|---|
| Mostly Sunny |  | Sunny | Cloudy |
| Wind 4 mph NW |  | Slight breeze | Wind 15-18 W |
|  |  | 0% chance rain |  |
|  |  | Dew point 54 |  |

As shown in Table XV, the columns and rows discarded by the user are stored in the south panel. The view of the south panel in Table XV includes the entirety of C3, nothing from C2, which was moved to the relevant north panel, and the rows from C1 and C4 that remained when C1 and C4 were swiped to the south panel. Table XVI depicts the state of the central panel if the user specifies to merge all relevant data:

TABLE XVI

| C1 | C2 | C3 | C4 |
|---|---|---|---|
|  | May 11th |  |  |
| High 64 | High 66 |  | High 55 |
|  | Sunny |  |  |
|  | Wind 10 mph N |  |  |
| 25% chance rain | 0% chance rain |  | 35% chance rain |
|  | Dew point 48 |  |  |

The central panel, as shown in Table XVI, includes all records from column C2, as well as the rows from C1 and C4 that the user swiped as being relevant (high temperatures and percentage chance of rain) from the east panel. Table XVII depicts a summary generated when a user requests all operations performed on the data in columns C1-C4:

TABLE XVII

| C1 | C2 | C3 | C4 |
|---|---|---|---|
| (x)May 10th | (o)May 11th | (x)May 12th | (x)May 13th |
| (x)Low 42 | (x)Low 48 | (x)Low 53 | (x)Low 40 |
| (o)High 64 | (o)High 66 | (x)High 69 | (o)High 55 |
| (x)Mostly Sunny | (o)Sunny | (x)Sunny | (x)Cloudy |
| (x)Wind 4 mph NW | (o)Wind 10 mph N | (x)Slight breeze | (x)Wind 15-18 W |
| (o)25% chance rain | (o)0% chance rain | (x)0% chance rain | (o)35% chance rain |
| (x)Dew point 45 | (o)Dew point 48 | (x)Dew point 54 | (x)Dew point 50 |

In Table XVII, records marked with (x) have been removed, whereas records marked with (o) have been marked by the user as relevant, and have been archived. This example reflects an embodiment where data in the central table is cleared before the table is populated with data from the north and east panels.

As shown, storage 408 contains the input data 415, which stores formatted data consumed by the distributed table application 412. Although depicted as a database, the input data 415 may take any form sufficient to store data records formatted according to a particular format and identifiable using a unique identifier, including text files, xml data files, and the like. As shown, plurality of remote data sources $450_{1-N}$ also include the input data 415, which may be accessed by the distributed table application. The linked tables generated by the distributed table application 412 may be stored in the memory 406 (not shown).

Advantageously, embodiments disclosed herein allow users to consume large data sets on a touchscreen mobile device by providing a central panel linked to other panels.

The central panel displays at least one set of data records on the touchscreen, which are filtered through by the user via one or more swipe gestures. The linked panels each have a corresponding function, including archiving relevant information or collecting irrelevant information. If an orientation of the swipe gesture matches a display orientation of the data, all data records sharing the same unique identifier are moved. If the orientation of the swipe gesture is perpendicular to the display orientation, the selected attribute values are moved. Advantageously, if the swipe is a two-finger swipe, multiple sets of data may also be moved. At any point, the user may specify to "merge" all data, which causes the central panel to display only those data records identified by the user as relevant, and clearing out all linked panels.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer program product, comprising:
a non-transitory computer-readable storage medium having computer-readable program code embodied therewith, the computer-readable program code executable by a processor to perform an operation comprising:
generating a first arrangement of a first plurality of database records, each of the first plurality of database records being uniquely identifiable by a respective record identifier;
outputting the first arrangement for display in a first table in a first panel on a touchscreen device;
associating: (i) a second table in a second panel with a first direction and an archiving operation, (ii) a third table in a third panel with a second direction and a deletion operation, (iii) a fourth table in a fourth panel with a third direction and the archiving operation, and (iv) a fifth table in a fifth panel with a fourth direction and the deletion operation;
responsive to receiving a predefined gesture having an orientation matching an orientation of the first plurality of database records of the first arrangement on the touchscreen device:
upon determining that a direction of the predefined gesture is in a first direction, moving the first arrangement to the second table in the second panel on the touchscreen device, thereby designating the first arrangement for the archiving operation;
upon determining that the direction of the predefined gesture is in the second direction, opposite to the first direction, moving the first arrangement the third table in the second panel on the touchscreen device, thereby designating the first arrangement for the deletion operation;
responsive to receiving a predefined gesture having an orientation transverse to the orientation of the first plurality of database records of the first arrangement:
upon determining that a direction of the predefined gesture is in the third direction, moving a first record, of the plurality of database records, selected by the predefined gesture, to the fourth table in the fourth panel on the touchscreen device, thereby designating the first record for the archiving operation; and
upon determining that the direction of the predefined gesture is in the fourth direction, opposite to the third direction, moving the first record to the fifth table in the fifth panel on the touchscreen device, thereby designating the first record for the deletion operation; and
responsive to receiving an indication, performing a merge operation comprising:
deleting records in the third and fifth tables, thereby performing the deletion operation.

2. The computer program product of claim 1, wherein the first plurality of database records of the first arrangement are not displayed in the first table of the first panel subsequent to moving the first arrangement to the second table in the second panel, wherein the first record is not displayed in the first table in the first panel subsequent to moving the first record to the fourth table in the fourth panel, the operation further comprising:
responsive to receiving the predefined gesture having an orientation matching the orientation of the first plurality of database records of the first arrangement:
receiving a second arrangement of a second plurality of database records from a database; and
updating the first table to include the second arrangement of the second plurality of database records from the database; and
outputting the first table in the first panel on the touchscreen device.

3. The computer program product of claim 2, wherein the predefined gesture has an orientation transverse to the orientation of the first plurality of database records of the first arrangement, wherein the second arrangement does not include a second database record, of the second plurality of database records, corresponding to a database column of the first record selected by the predefined gesture.

4. The computer program product of claim 3, wherein the predefined gesture is a swipe gesture, wherein the orientation of the first plurality of database records comprises, in respective instances, each of: (i) a columnar orientation, and (ii) a row orientation, the operation further comprising:
upon determining that the predefined gesture is a two-finger swipe gesture, wherein each of the first arrangement and second arrangement are between each finger of the two-finger swipe gesture:
moving the first arrangement and the second arrangement to the second, third, fourth, or fifth tables on the touchscreen device.

5. The computer program product of claim 1, wherein the first arrangement is archived locally and remotely, the operation further comprising:
responsive to receiving selection of one of the second table in the second panel, the third table in the third panel, the fourth table in the fourth panel, and the fifth table in the fifth panel on the touchscreen device:
removing the first table and the first panel from display on the touchscreen device; and
outputting the selected table and the selected panel for display on the touchscreen device.

6. The computer program product of claim 1, the operation further comprising:
upon determining that the first plurality of database records and a second plurality of database records fit on the touchscreen display, generating the first arrangement to include the first plurality and the second plurality of database records.

7. The computer program product of claim 1, wherein the merge operation further comprises:
generating a second arrangement of database records comprising each database record, of the first plurality of database records, moved to the second table in the second panel on the touchscreen device and to the fourth table in the fourth panel on the touchscreen device for storage;

clearing the first table in the first panel of database records; and outputting the second arrangement for display in the first table in the first panel on the touchscreen device, thereby performing the archiving operation.

8. The computer program product of claim 1, wherein the touchscreen display outputs one of the first, second, third, fourth, and fifth panels at a time.

9. A system, comprising:

one or more computer processors; and a memory containing a program which when executed by the one or more computer processors, performs an operation, the operation comprising:

generating a first arrangement of a first plurality of database records, each of the first plurality of database records being uniquely identifiable by a respective record identifier;

outputting the first arrangement for display in a first table in a first panel on a touchscreen device;

associating: (i) a second table in a second panel with a first direction and an archiving operation, (ii) a third table in a third panel with a second direction and a deletion operation, (iii) a fourth table in a fourth panel with a third direction and the archiving operation, and (iv) a fifth table in a fifth panel with a fourth direction and the deletion operation;

responsive to receiving a predefined gesture having an orientation matching an orientation of the first plurality of database records of the first arrangement on the touchscreen device:

upon determining that a direction of the predefined gesture is in a first direction, moving the first arrangement to the second table in the second panel on the touchscreen device, thereby designating the first arrangement for the archiving operation;

upon determining that the direction of the predefined gesture is in the second direction, opposite to the first direction, moving the first arrangement to the third table in the second panel on the touchscreen device, thereby designating the first arrangement for the deletion operation;

responsive to receiving a predefined gesture having an orientation transverse to the orientation of the first plurality of database records of the first arrangement:

upon determining that a direction of the predefined gesture is in the third direction, moving a first record, of the plurality of database records, selected by the predefined gesture, to the fourth table in the fourth panel on the touchscreen device, thereby designating the first record for the archiving operation; and upon determining that the direction of the predefined gesture is in the fourth direction, opposite to the third direction, moving the first record to the fifth table in the fifth panel on the touchscreen device, thereby designating the first record for the deletion operation; and responsive to receiving an indication, performing a merge operation comprising:

deleting records in the third and fifth tables, thereby performing the deletion operation.

10. The system of claim 9, wherein the first plurality of database records of the first arrangement are not displayed in the first table of the first panel subsequent to moving the first arrangement to the second table in the second panel, wherein the first record is not displayed in the first table in the first panel subsequent to moving the first record to the fourth table in the fourth panel, the operation further comprising:

responsive to receiving the predefined gesture having an orientation matching the orientation of the first plurality of database records of the first arrangement:

receiving a second arrangement of a second plurality of database records from a database; and updating the first table to include the second arrangement of the second plurality of database records from the database; and outputting the first table in the first panel on the touchscreen device.

11. The system of claim 10, wherein the predefined gesture has an orientation transverse to the orientation of the first plurality of database records of the first arrangement, wherein the second arrangement does not include a second database record, of the second plurality of database records, corresponding to a database column of the first record selected by the predefined gesture.

12. The system of claim 11, wherein the predefined gesture is a swipe gesture, wherein the orientation of the first plurality of database records comprises, in respective instances, each of: (i) a columnar orientation, and (ii) a row orientation, the operation further comprising:

upon determining that the predefined gesture is a two-finger swipe gesture, wherein each of the first arrangement and second arrangement are between each finger of the two-finger swipe gesture:

moving the first arrangement and the second arrangement to the second, third, fourth, or fifth tables on the touchscreen device.

13. The system of claim 9, wherein the first arrangement is archived locally and remotely, the operation further comprising:

responsive to receiving selection of one of the second table in the second panel, the third table in the third panel, the fourth table in the fourth panel, and the fifth table in the fifth panel on the touchscreen device:

removing the first table and the first panel from display on the touchscreen device; and outputting the selected table and the selected panel for display on the touchscreen device.

14. The system of claim 9, the operation further comprising:

upon determining that the first plurality of database records and a second plurality of database records fit on the touchscreen display, generating the first arrangement to include the first plurality and the second plurality of database records.

15. The system of claim 9, wherein the merge operation further comprises:

generating a second arrangement of database records comprising each database record, of the first plurality of database records, moved to the second table in the second panel on the touchscreen device and to the fourth table in the fourth panel on the touchscreen device for storage;

clearing the first table in the first panel of database records; and outputting the second arrangement for display in the first table in the first panel on the touchscreen device.

16. The system of claim 9, wherein the touchscreen display outputs one of the first, second, third, fourth, and fifth panels at a time.

* * * * *